United States Patent [19]

Mashita et al.

[11] 4,339,351

[45] Jul. 13, 1982

[54] PROCESS FOR PRODUCING OLEFIN POLYMERS

[75] Inventors: Kentaro Mashita; Katsumi Hanji, both of Ibaraki, Japan

[73] Assignee: Sumitomo Chemical Company, Limited, Osaka, Japan

[21] Appl. No.: 213,029

[22] Filed: Dec. 4, 1980

[30] Foreign Application Priority Data

Dec. 18, 1979 [JP] Japan .................................. 54-165341

[51] Int. Cl.$^3$ ............................ C08F 4/64; C08F 4/68
[52] U.S. Cl. ............................ 252/429 B; 252/431 R; 526/132; 526/133
[58] Field of Search ........................ 252/429 B, 431 R

[56] References Cited

U.S. PATENT DOCUMENTS

| | | | |
|---|---|---|---|
| 3,579,493 | 5/1971 | Ziegler et al. | 252/429 B X |
| 4,209,601 | 6/1980 | Kuroda et al. | 252/429 B X |
| 4,258,168 | 3/1981 | Karayannis et al. | 252/429 B X |

FOREIGN PATENT DOCUMENTS 52-76189 11/1976 Japan .
52-15314 4/1977 Japan .
1504930 5/1975 United Kingdom .
1546718 9/1976 United Kingdom .

*Primary Examiner*—Patrick Garvin
*Attorney, Agent, or Firm*—Stevens, Davis, Miller & Mosher

[57] ABSTRACT

A process for producing olefin polymers, which comprises polymerizing or copolymerizing olefins in the presence of a catalyst comprising a solid catalyst component and an organoaluminum compound, said solid catalyst component being a titanium compound and/or a vanadium compound supported on a solid product obtained by the reaction between a Grignard compound and a boron compound represented by the general formula $B(OR^1)_a R^2_b R^3_c$, wherein a, b and c are numbers defined by the formulas $0 < a \leq 3$, $0 \leq b < 3$, $0 \leq c < 3$ and $a+b+c=3$, $R^1$ represents a hydrocarbon radical having 1 to 20 carbon atoms, and $R^2$ and $R^3$, which may be the same or different, represent each a hydrogen atom, a hydrocarbon radical having 1 to 20 carbon atoms, or a halogen atom.

13 Claims, No Drawings

PROCESS FOR PRODUCING OLEFIN POLYMERS

This invention relates to a process for polymerizing or copolymerizing olefins with a novel high-activity polymerization catalyst. More particularly, it relates to a process for polymerizing olefins, which is characterized by polymerizing or copolymerizing olefins in the presence of a catalyst comprising a combination of a solid catalyst component and an organoaluminum compound, said solid catalyst component being a titanium compound and/or a vanadium compound supported on a solid product obtained by the reaction between a Grignard compound and a specific boron compound.

It has heretofore been well known that a catalyst (so-called Ziegler catalyst) comprising a combination of a compound of transition metals of Groups IVb to VIb and an organometallic compound of metals of Groups I to III of the periodic table is an effective catalyst for the polymerization of olefins. Further, a large number of research results have been reported on the supported catalysts prepared by supporting transition metal compounds on various carriers and it has been known that inorganic compounds such as oxides, hydroxides, chlorides and carbonates of metals, mixtures thereof, and double salts are effective as carriers.

In the production of polyolefins, however, catalysts are required to have an activity as high as possible and the activities of conventional catalysts are never sufficient and nor satisfactory for the industrial viewpoint. Further, a high-activity catalyst capable of producing a polymer slurry of desirable properties in an industrially advantageous manner is also required.

According to this invention, because of a very high yield of the polymer per unit weight of the solid catalyst and of the transition metal, there is no need to remove the residual catalyst from the polymer. In the slurry polymerization according to this invention, because of desirable conditions for the polymer formation, the build-up of polymer on the wall of polymerization vessel is very little. Moreover, the polymer which is finally obtained has a high bulk density and a narrow particle size distribution. These features of the process of this invention are extremely advantageous when the process is carried out on an industrial scale. Furthermore, the catalyst of this invention exhibits a high activity not only in slurry polymerization but also in solution polymerization at high temperatures or in a gas phase polymerization.

In producing olefin polymers, a high catalytic activity naturally increases the industrial value of the catalyst because it dispenses with the removal of catalyst residue from the polymerization product and, hence, simplifies the process of polymer production. Moreover, the value of a catalyst will be further increased if the catalyst is capable of decreasing as far as possible the build-up of polymer on the wall of polymerization vessel and producing a polymer slurry of desirable behavior, because polymerization is often troubled with the build-up of polymer which results in a decrease in operation efficiency.

For the above reasons, in the production of an olefin polymer, the value of a catalyst is appraised high if it has a catalytic activity so high as to dispense with the step of removing the catalyst residue and if it produces a polymer slurry of desirable properties.

The present inventors made extensive investigations to develop a process for polymerizing olefins with an industrially advantageous catalyst having such a high activity as mentioned above. As a result, it was found that a catalyst comprising a component prepared by supporting a titanium compound and/or a vanadium compound on a solid product, obtained by reacting a Grignard compound with a specified boron compound and as another component, an organoaluminum compound, exhibits an extremely high activity in the polymerization of olefins. This finding has led to the accomplishment of this invention.

An object of this invention is to provide a process for polymerizing or copolymerizing olefins by the use of a novel high-activity catalyst.

Another object of this invention is to provide a catalyst system for olefin polymerization, which has a high activity and a desirable slurry-forming property and which produces a polymer in desirable powder form.

Other objects and advantages of this invention will become apparent from the following description.

According to this invention a process for producing olefin polymers is provided, which comprises polymerizing or copolymerizing olefins in the presence of a catalyst comprising a combination of a solid catalyst component and an organoaluminum compound, said solid catalyst component being a titanium compound and/or a vanadium compound supported on a solid product obtained by the reaction between a Grignard compound and a boron compound represented by the general formula $B(OR^1)_a R^2_b R^3_c$, wherein a, b and c are numbers defined by the formulas $0 < a \leq 3$, $0 \leq b < 3$, $0 \leq c < 3$ and $a+b+c=3$, $R^1$ represents a hydrocarbon radical having 1 to 20 carbon atoms, and $R^2$ and $R^3$, which may be the same or different, represent each a hydrogen atom, a hydrocarbon radical having 1 to 20 carbon atoms, or a halogen atom. Since said catalyst has a high polymer productivity per unit weight of the solid catalyst and of the transition metal and has only a small halogen content, no problem will arise with respect to physical properties of the polymer even if the catalyst residue remains in the product; there is also no problem of corrosion of the equipment. This olefin polymerization catalyst produces a slurry of desirable behavior and a polymer of desirable powder form.

Particulars of the present invention are as described below.

The term "Grignard compound" has heretofore been used frequently in a narrow sense, meaning an organomagnesium compound represented by the general formula $R^4MgX$ (wherein $R^4$ represents a hydrocarbon radical having 1 to 20 carbon atoms and X represents a halogen atom) and even those complexed with an ether. However, the term "Grignard compound", as herein used in a broad sense, includes any type of organomagnesium compounds generally formed by the reaction between an alkyl halide ($R^4X$) and metallic magnesium (Mg).

Thus the Grignard compound used in preparing the catalyst according to this invention has any of the equilibrium compositions represented by the general formula

no matter whether the compound is prepared in the presence of an ether or not. [W. Schlenk et al., Ber., 62, 920 (1929); ibid., 64, 739 (1931)]. In the above formula, $R^4$ represents an alkyl, cycloalkyl, aryl, aralkyl or alkenyl group having up to 20 carbon atoms such as methyl, ethyl, n-propyl, isopropyl, n-butyl, sec-butyl, tert-butyl, n-amyl, isoamyl, n-hexyl, n-octyl, 2-ethylhexyl, cyclohexyl, phenyl or benzyl. More particularly, examples of such Grignard compounds include alkylmagnesium halides such as ethylmagnesium chloride, ethylmagnesium bromide, n-propylmagnesium chloride, n-butylmagnesium chloride, tert-butylmagnesium chloride, n-amylmagnesium chloride, phenylmagnesium bromide, and compounds of equilibrium composition represented by the formula $R^4Mg \cdot MgX_2$.

Further, as shown by the above equilibrium formula, dialkylmagnesium compounds represented by the general formula $R^4_2Mg$ are also included in the Grignard compounds in this invention. Typically, these compounds include diethylmagnesium, dipropylmagnesium, dibutylmagnesium, diamylmagnesium, dihexylmagnesium, dioctylmagnesium, diphenylmagnesium and dibenzylmagnesium.

The above Grignard compounds are synthesized and used in the presence of an ethereal solvent such as ethyl ether, di-n-propyl ether, diisopropyl ether, di-n, sec- or tert-butyl ether, di-n-amyl ether, diisoamyl ether, tetrahydrofuran or dioxane or a hydrocarbon solvent such as hexane, heptane, octane, cyclohexane, benzene, toluene or xylene, or a mixture of an ethereal solvent and a hydrocarbon solvent.

In the general formula $B(OR^1)_aR^2_bR^3_c$ representing boron compounds, $R^1$ represents hydrocarbon radicals having 1 to 20 carbon atoms including alkyl groups, cycloalkyl groups, aryl groups, aralkyl groups and alkenyl groups such as, typically, methyl, ethyl, propyl (n-propyl, isopropyl), butyl (n-butyl, sec-butyl, tert-butyl), amyl (n-amyl, isoamyl), n-hexyl, n-heptyl, n-octyl, vinyl, allyl, cyclopentyl, cyclohexyl, phenyl and benzyl. $R^2$ and $R^3$, which may be the same or different, represent each a hydrocarbon radical having 1 to 20 carbon atoms (e.g. alkyl, cycloalkyl, aryl, aralkyl, alkenyl as described above) or a halogen atom such as fluorine, chlorine or bromine. The number a is defined by the formula $0 < a \leq 3$, preferably by the formula $1 \leq a \leq 3$ in view of the catalytic activity and the form of slurry; the numbers b and c are defined by the formula $0 \leq b \leq 3$, $0 \leq c < 3$, preferably by the formula $0 \leq b \leq 2$, $0 \leq c \leq 2$; a, b and c are interrelated in accordance with the equation $a+b+c=3$.

More particularly, the compounds of the above general formula include trimethyl borate, triethyl borate, triphenyl borate, methylboron diethoxide, ethylboron diethoxide, ethylboron dibutoxide, butylboron dibutoxide, phenylboron diphenoxide, diethylboron ethoxide, dibutylboron ethoxide, diphenylborn phenoxide, diethoxyborone, dibutoxyborane, diphenoxyborane, diethoxyboron chloride, diethoxyboron bromide, diphenoxyboron chloride, ethoxyboron dichloride, ethoxyboron dibromide, butoxyboron dichloride, phenoxyboron dichloride, ethylethoxyboron chloride $[(H_5C_2O)B(C_2H_5)Cl]$, butylethoxyboron bromide $[(H_5C_2O)B(C_4H_9)Br]$, and ethylphenoxyboron chloride $[(H_5C_6O)B(C_2H_5)Cl]$. A boron compound which has been prepared in advance can be reacted with a Grignard compound, or the boron compound can be formed in the reaction system.

The titanium compounds and vanadium compounds supported on the carrier are titanium tetrachloride, titanium tetrabromide, titanium tetraiodide, titanium trichloride, alkoxytitanium compounds represented by the general formula $Ti(OR^5)_{4-p}X_p$, vanadium tetrachloride, vanadium oxytrichloride, and others. Of these, titanium tetrachloride is particularly preferred in view of the polymerization activity and particle properties.

The titanium compounds represented by the general formula $Ti(OR^5)_{4-p}X_p$ (wherein $R^5$ represents an alkyl, cycloalkyl, aryl or aralkyl group having up to 20 carbon atoms, X represents a halogen atom, and p is a number defined by the formula $0 \leq p < 4$) include tetraethoxytitanium, ethoxytitanium trichloride, diethoxytitanium dichloride, triethoxytitanium chloride, propoxytitanium trichloride, butoxytitanium trichloride, phenoxytitanium trichloride, ethoxytitanium tribromide, dipropoxytitanium dibromide, and tributoxytitanium bromide.

The preparation of the catalyst is carried out under an atmosphere of inert gas such as nitrogen or argon.

The reaction between a Grignard compound and a boron compound is conducted in the presence of a solvent at −78° to 100° C., though the heating at a temperature higher than 100° C. will do no harm.

The solvents to be employed in the reaction are ethereal solvents such as diethyl ether, diisopropyl ether, di-n-butyl ether, di-sec-butyl ether, di-n-amyl ether, diisoamyl ether, tetrahydrofuran and dioxane; aliphatic hydrocarbons such as pentane, hexane, heptane and octane; aromatic hydrocarbons such as benzene, toluene and xylene; cycloaliphatic hydrocarbons such as cyclohexane and cyclopentane; and mixtures of hydrocarbon solvents and ethereal solvents. Of these, ethereal solvents are preferred.

Although not critical, the reaction ratio of the Grignard compound to the boron compound is generally 0.1 to 10.0, preferably 0.5 to 2.0 by mole. The reaction product is allowed to precipitate as a solid.

The reaction product obtained as described above is isolated and used as the carrier. More particularly, the reaction product is collected by filtration and used as the carrier as such or after having been thoroughly washed with a purified hydrocarbon diluent and dried or without drying. The titanium compound and/or the vanadium compound can be supported on the carrier in a customary manner, by impregnation, kneading, or co-preciptation. However, a preferable way is to bring the titanium compound and/or vanadium compound into contact with the carrier in the absence of a solvent or in the presence of an inert solvent. It is also possible to prepare the supported catalyst component by grinding the carrier together with a liquid or solid titanium compound and/or a vanadium compound in a ball mill or the like. The catalyst supporting reaction is conducted preferably at a temperature of from room temperature (about 20° C.) to 150° C. After completion of the reaction, the reaction product is generally filtered, thoroughly washed with a purified hydrocarbon diluent and used as such or after drying. The supported amount of titanium atom or vanadium atom is generally in the range of 0.1 to 30%, most preferably 0.5 to 15%, by weight based on the formed solid catalyst component.

The organoaluminum compounds which, together with the above solid catalyst components, form the catalyst system are those represented by the general formula $AlR^6_nX_{3-n}$, wherein $R^6$ represents an alkyl, cycloalkyl, or aromatic hydrocarbon radical having up to 18 carbon atoms and n is a number defined by the formula $1 \leq n \leq 3$. Examples of suitable compounds are trialkylaluminums such as triethylaluminum, tri-n-propylaluminum, tri-n-butylaluminum, and tri-n-hexylaluminum; dialkylaluminum monohalides such as diethylaluminum monochloride, di-n-propylaluminum monochloride, di-n-butylaluminum monochloride, and di-n-hexylaluminum monochloride; alkylaluminum dihalides such as ethylaluminum dichloride, n-propylaluminum dichloride, n-butylaluminum dichloride, and n-hexyl-aluminum dichloride; and alkylaluminum sesquihalides such as ethylaluminum sesquichloride, n-propylaluminum sesquichloride, n-butylaluminum sesquichloride, and n-hexylaluminum sesquichloride. These organoaluminum compounds are used each alone or in mixtures of two or more.

The catalyst system according to this invention is extremely active and can operate at so high a catalytic efficiency that even when the step of removing the catalyst residue is omitted, no problem will arise regarding the quality of polymer or the corrosion of equipment. It causes little build-up the polymer on the reactor wall and produces a polymer having a uniform particle size and a high bulk density.

The olefins used in the process of this invention include those having 2 to 15 carbon atoms such as ethylene, propylene, butene-1, 4-methylpentene-1, hexene-1 and octene-1. The present process is especially suitable for the homopolymerization of ethylene or the copolymerization of ethylene with other olefins, chiefly propylene, butene-1, 4-methylpentene-1, hexene-1 and octene-1.

The polymerization according to this invention can be carried out in the same manner as in the olefin polymerization with a so-called Ziegler-Natta type catalyst. Any of the techniques such as slurry polymerization in an inert solvent, solution polymerization, bulk polymerization in a liquid monomer, and gas phase polymerization without a solvent can be used. Although depending upon the type of polymerization process, the polymerization temperature and the polymerization pressure are generally in the ranges of from room temperature (about 20° C.) to 200° C. and from atmospheric pressure to about 100 atmospheres, respectively. These temperature and pressure conditions are not critical and it is possible to carry out the polymerization at a higher temperature and a higher pressure. A molecular weight regulator such as hydrogen can be used. When a solvent is used in the polymerization, it is selected from aliphatic hydrocarbons such as butane, pentane, hexane and heptane, cycloaliphatic hydrocarbons such as cyclohexane and cycloheptane and aromatic hydrocarbons such as benzene, toluene and xylene.

The invention is illustrated below in further details with reference to Examples, but the invention is not limited thereto unless the example departs from the essential feature of the invention. In Examples, the melt index was determined at 190° C. in accordance with JIS K 6760.

EXAMPLE 1

(1) Synthesis of Grignard compound

A 1-liter four-necked flask provided with a stirrer, reflux condenser, dropping funnel and thermometer was evacuated with heating and then filled with dry nitrogen at atmospheric pressure. This operation was repeated three times to remove completely the oxygen and moisture from the flask. The following procedure was conducted always under a dry nitrogen atmosphere.

36.5 g (1.5 moles) of magnesium turnings for the Grignard reagent were placed into the flask followed by 308 ml of n-butyl ether. A mixture of 187 ml (1.8 moles) of n-butyl chloride and 200 ml of n-butyl ether was added dropwise from the dropping funnel to the magnesium in the flask. The reaction was allowed to proceed at 50° C. and the dropwise addition was continued for 2 hours. After completion of the dropwise addition, the reaction system was stirred for 1.5 hours while heating at 60° C. to complete the reaction. After having been left standing and cooled, the supernatant liquid was filtered through a glass filter. On analysis, the concentration of Grignard compound in the resulting n-butyl ether solution was found to be 2.1 moles 1 liter.

(2) Synthesis of solid catalyst component

A 100-ml four-necked flask provided with a stirrer, reflux condenser, dropping funnel, and thermometer was evacuated while heating and then filled with dry nitrogen at atmospheric pressure. This operation was repeated three times to remove completely the oxygen and moisture from the flask.

20 ml (42 mmoles) of the solution of n-butylmagnesium chloride in n-butyl ether were prepared in (1) and placed in the above flask. To this solution 7.1 ml (42 mmoles) of triethyl borate were added dropwise over a period of 15 minutes at room temperature to 50° C. The mixture was allowed to react for one hour at 60° C. After standing at room temperature, the reaction mixture was admixed with 50 ml of n-heptane and the supernatant liquid was removed. The residue was washed five times with 50 ml of n-heptane. The solid product which was formed was separated and dried under reduced pressure to yield 6.79 g of a white solid which on analysis gave the following results: Mg, 11.47% by weight; Cl, 14.12% by weight; B, 3.11% by weight.

5.64 g of the thus obtained solid product were immersed into 28.2 ml of titanium tetrachloride in a 100-ml four-necked flask, and allowed to react with stirring at 100° C. for one hour. The reaction mixture was admixed with 50 ml of n-heptane, separated from the supernatant liquid, washed five times with 50 ml of hot heptane (90° C.), and dried under reduced pressure to yield 4.46 g of a pale yellow solid catalyst component which on analysis gave the following results: Ti, 4.61% by weight; Mg, 12.81% by weight; Cl, 46.96% by weight; B, 3.40% by weight.

(3) Polymerization

Into a 5-liter stainless steel autoclave provided with an electromagnetic induction stirrer, which had been thoroughly flushed with nitrogen, 2.5 liters of thoroughly dehydrated and deoxygenated n-heptane and 10 mmoles of triethylaluminum were charged. Hydrogen to a partial pressure of 5 kg/cm$^2$ followed by ethylene to a partial pressure to 10 kg/cm$^2$ were introduced into the autoclave which was heated to 70° C. 16.3 mg of the above-mentioned solid catalyst component were added in the autoclave under applied pressure to initiate polymerization. The polymerization was continued for one hour at 70° C. while replenishing with ethylene to keep the total pressure constant. The polymerization was terminated with isopropyl alcohol and the unreacted ethylene was purged. The formed polymer was collected by filtration and dried at 60° C. under reduced pressure to obtain 524 g of polyethylene having a melt index of 0.26 g/10 minutes. The catalytic activity was 3,210 g polyethylene/g solid catalyst-hour-ethylene pressure or 69,800 g polyethylene/g Ti-hour-ethylene pressure.

EXAMPLE 2

TABLE 1
Preparation of catalyst and results of polymerization.

| | Preparation of catalyst | | | | Polymerization conditions and results | | | Catalytic activity | | |
|---|---|---|---|---|---|---|---|---|---|---|
| Example No. | $B(OR^1)_a R^2{}_b R^3{}_c$ | Grignard compound | Titanium or vanadium compound | Supported amount of Ti or V (% by weight) | Amount of solid catalyst used (mg) | Organo-aluminum compound | Yield (g) | g PE/g solid catalyst . hour . $C_2H_4$ pressure | g PE/g Ti . hour . $C_2H_4$ pressure | Melt index (g/10 minutes) |
| 3 | $B(OMe)_3$ 42 mmole | n-BuMgCl 42 mmole | $TiCl_4$ | 5.3 | 15.8 | $AlEt_3$ | 483 | 3,060 | 57,700 | 0.14 |
| 4 | $B(OEt)_2Cl$ 21 mmole | EtMgCl 42 mmole | $TiCl_4$ | 4.8 | 14.9 | $AlEt_3$ | 467 | 3,130 | 65,200 | 0.31 |
| 5 | $B(OPh)Ph_2$ 42 mmole | n-BuMgCl 42 mmole | $Ti(OEt)_2Cl_2$ | 5.7 | 13.7 | $Al(i\text{-}Bu)_3$ | 531 | 3,880 | 68,100 | 0.48 |
| 6 | $B(O\text{---}n\text{-}Bu)_2 n\text{-}Bu$ 35 mmole | i-PrMgBr 42 mmole | $TiCl_4$ | 5.0 | 15.4 | $Al(i\text{-}Bu)_3$ | 526 | 3,420 | 68,400 | 0.34 |
| 7 | $B(OEt)_3$ 32 mmole | n-BuMgCl 21 mmole | $VOCl_3$ | 5.4 | 14.8 | $AlEt_2Cl$ | 418 | 2,820 | 52,200 | 0.29 |

Note: In the molecular formulas of compounds, Me, Et, i-Pr, n-Bu, i-Bu, and Ph stand for methyl, ethyl, isopropyl, n-butyl, isobutyl, and phenyl, respectively.

(1) Synthesis of solid catalyst component

A 200-ml four-necked flask provided with a stirrer, reflux condenser, dropping funnel and thermometer was evacuated while heating and then filled with dry nitrogen at atmospheric pressure. This operation was repeated three times to remove completely the oxygen and moisture from the flask. 20 ml (42 mmoles) of the n-butyl ether solution of n-butyl-magnesium chloride prepared in (1) of Example 1 were charged into the flask and 12.2 g (42 mmoles) of triphenyl borate dissolved in 30 ml of n-butyl ether over a period of 30 minutes at room temperature to 40° C. were added. The reaction was then continued for 30 minutes at 60° C. and for one hour at 100° C. The reaction mixture was then admixed with 100 ml of n-heptane, separated from the supernatant liquid at 90° C., and washed five times with 100 ml of hot heptane (90° C.). The resulting solid product was separated and dried under reduced pressure to obtain 5.52 g of a white solid which on analysis gave the following results: Mg, 10.70% by weight; Cl, 13.62% by weight; B, 4.89% by weight.

A 100-ml four-necked flask was provided containing 19.4 ml of titanium tetrachloride. Therein, 3.88 g of the above solid product were immersed and allowed to react with stirring at 100° C. for one hour. The reaction mixture was admixed with 50 ml of n-heptane at 90° C., separated from the supernatant liquid, washed six times with 50 ml of hot heptane (90° C.), and dried under reduced pressure to yield 3.54 g of a brown solid catalyst component which on analysis gave the following results: Ti, 5.51% by weight; Mg, 11.45% by weight; Cl, 41.41% by weight; B, 3.13% by weight.

(2) Polymerization

The polymerization was conducted by using the thus obtained solid catalyst component in a manner similar to that in Example 1. Obtained were 564 g of polyethylene having a melt index of 0.56 g/10 minutes. The catalytic activity was 4,370 g polyethylene/g solid catalyst·hour·ethylene pressure or 79,500 g polyethylene/g Ti·hour·ethylene pressure.

EXAMPLES 3 to 7

In a manner similar to that in Example 1 or 2, the preparation of catalysts and polymerization were carried out. The results obtained were as shown in Table 1.

EXAMPLE 8

A 5-liter stainless steel autocalve provided with an electromagnetic induction stirrer, which had been thoroughly flushed with nitrogen, was provided. Therein 625 g of butane, 625 g of butene-1 and 15 mmoles of triethylaluminum were charged. Hydrogen to a partial pressure of 6 kg/cm² followed by ethylene to a partial pressure of 10 kg/cm² were introduced in the autoclave which was heated to 50° C. Under applied pressure, 7.5 mg of the solid catalyst component prepared in Example 1 were added into the autoclave to initiate the polymerization. The polymerization was continued for one hour at 50° C. while replenishing with ethylene to keep the total pressure constant. The polymerization was terminated with isopropyl alcohol and the solvent and unreacted ethylene and butene-1 were purged. The polymer which was formed was dried at 60° C. under reduced pressure to obtain 740 g of a copolymer having 16 methyl groups per 1,000 carbon atoms, which showed a melt index of 3.6 g/10 minutes. The catalytic activity was 9,870 g copolymer/g solid catalyst·hour·ethylene pressure or 215,000 g copolymer/g Ti·hour·ethylene pressure.

EXAMPLE 9

A 5-liter stainless steel autoclave having an electromagnetic induction stirrer was provided having been thoroughly flushed with nitrogen. Therein, 2.2 liters of n-heptane which had been thoroughly dehydrated and deoxygenated, 200 g of hexene-1, and 10 mmoles of diethylaluminum monochloride were charged. The autoclave had been heated to 140° C., and then hydrogen to a partial pressure of 2 kg/cm² followed by ethylene to a partial pressure of 20 kg/cm² were introduced therein. Then, 22.0 mg of the solid catalyst component prepared in Example 2 were added under applied pressure into the autoclave to initiate the polymerization. The polymerization was continued for one hour at 140° C. while replenishing with ethylene to keep the total pressure constant. The polymerization was terminated with isopropyl alcohol and the autoclave was pured to bring the pressure to atmospheric pressure. The polymer which was formed was washed with methanol and dried under reduced pressure at 60° C. to obtain 357 g of a copolymer having 21 methyl groups per 1,000 carbon atoms and a melt index of 1.8 g/10 minutes. The catalytic activity was 810 g copolymer/g solid catalyst·hour·ethylene pressure or 14,700 g copolymer/g Ti·hour·ethylene pressure.

EXAMPLE 10

A 5-liter stainless steel autoclave having an electromagnetic induction stirrer, and having been thoroughly flushed with nitrogen, was provided. Therein 15 ml of a n-heptane solution containing 15 mmoles of triethylaluminum followed by 84.0 mg of the solid catalyst component prepared in Example 3 were charged. Subsequently hydrogen to a partial pressure of 0.5 kg/cm$^2$ followed by 1,500 g of a liquified propylene which was introduced under application of pressure, were introduced in the autoclave. While stirring, the autoclave was kept at 70° C. for one hour. After termination of the polymerization with isopropyl alcohol, the excess propylene was purged and the polymer was taken out of the autoclave and dried at 60° C. under reduced pressure to obtain 529 g of polypropylene, 77% of which was insoluble in boiling heptane. The catalytic activity was 210 g polypropylene/g solid catalyst·hour·propylene pressure or 3,860 g polypropylene/g Ti·hour·propylene pressure.

What is claimed is:

1. A catalyst component for polymerization of an olefin comprising a titanium compound and/or a vanadium compound supported on a solid product obtained by the reaction between a Grignard compound and a boron compound represented by the general formula B(OR$^1$)$_a$R$^2$$_b$R$^3$$_c$, wherein a, b and c are numbers defined by the formulas $0 < a \leq 3$, $0 \leq b < 3$, $0 \leq c < 3$ and $a+b+c=3$, R$^1$ represents a hydrocarbon radical having up to 20 carbon atoms, and R$^2$ and R$^3$, which may be the same or different, represent each a hydrogen atom, a hydrocarbon radical having up to 20 carbon atoms, or a halogen atom.

2. A catalyst component according to claim 1, wherein the Grignard compound is that represented by the general formula R$^4$MgX, wherein R$^4$ represents a hydrocarbon radical having 1 to 20 carbon atoms and X represents a halogen atom.

3. A catalyst component according to claim 1, wherein the hydrocarbon radical having up to 20 carbon atoms represented by R$^1$ in the general formula B(OR$^1$)$_a$R$^2$$_b$R$^3$$_c$ is an alkyl group, a cycloalkyl group, an aryl group or an alkenyl group.

4. A catalyst component according to claim 3, wherein the hydrocarbon radical is methyl, ethyl, n-propyl, isopropyl, n-butyl, sec-butyl, tert-butyl, n-amyl, isoamyl, n-hexyl, n-heptyl, n-octyl, vinyl, allyl, cyclopentyl, cyclohexyl, phenyl or benzyl.

5. A catalyst component according to claim 1, wherein the hydrocarbon radical having 1 to 20 carbon atoms represented by R$^2$ or R$^3$ in the general formula B(OR$^1$)$_a$R$^2$$_b$R$^3$$_c$ is an alkyl group, a cycloalkyl group, an aryl group or an alkenyl group and the halogen atom is fluorine, chlorine or bromine.

6. A catalyst component according to claim 1, wherein a, b, c are defined by the formulas $1 \leq a \leq 3$, $0 \leq b \leq 2$, $0 \leq c \leq 2$ and $a+b+c=3$.

7. A catalyst component according to claim 1, wherein the boron compound is trimethyl borate, triethyl borate, triphenyl borate, methylboron diethoxide, ethylboron diethoxide, ethylboron dibutoxide, butylboron dibutoxide, phenylboron diphenoxide, diethylboron ethoxide, dibutylboron ethoxide, diphenylboron phenoxide, diethoxyborane, dibutoxyborane, diphenoxyborane, diethoxyboron chloride, diethoxyboron bromide, diphenoxyboron chloride, ethoxyboron dichloride, ethoxyboron dibromide, butoxyboron dichloride, phenoxyboron dichloride, ethylethoxyboron chloride, butylethoxyboron bromide, or ethylphenoxyboron chloride.

8. A catalyst component according to claim 1, wherein the titanium or vanadium compound is vanadium tetrachloride, vanadium oxytrichloride, titanium tetrachloride, titanium tetrabromide, titanium tetraiodide, titanium trichloride, or an alkoxytitanium compound represented by the general formula Ti(OR$^5$)$_{4-p}$X$_p$, wherein R$^5$ represents an alkyl, cycloalkyl or phenyl group having up to 20 carbon atoms, X represents a halogen atom, and p is a number defined by the formula $0 \leq p < 4$.

9. A catalyst component according to claim 8, wherein the titanium compound is titanium tetrachloride.

10. A catalyst component according to claim 1, wherein the reaction between the Grignard compound and the boron compound is carried out in the presence of a solvent at −78° to 100° C.

11. A catalyst component according to claim 1, wherein the reaction ratio of the Grignard compound to the boron compound is from 0.1 to 10.0 on mole basis.

12. A catalyst component according to claim 11, wherein the reaction ratio of the Grignard compound to the boron compound is from 0.5 to 2.0 on mole basis.

13. A catalyst component according to claim 1, wherein the amount of titanium atom and/or vanadium atom contained in the solid catalyst component is 0.1 to 30% by weight.

* * * * *